July 21, 1942.   C. D. RIEGER   2,290,619
METHOD OF REINFORCING PROTUBERANCES ON METALLIC MEMBERS
Filed Oct. 17, 1939   6 Sheets-Sheet 1
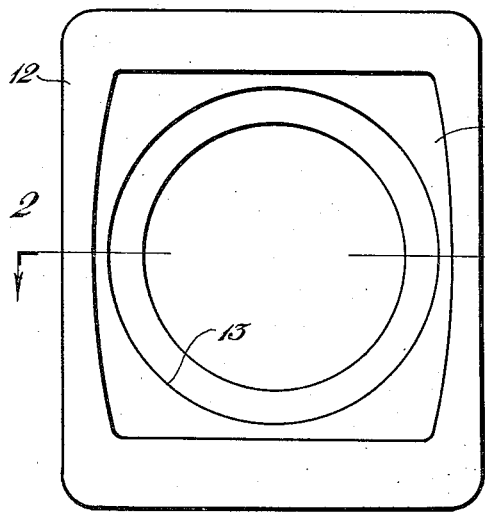
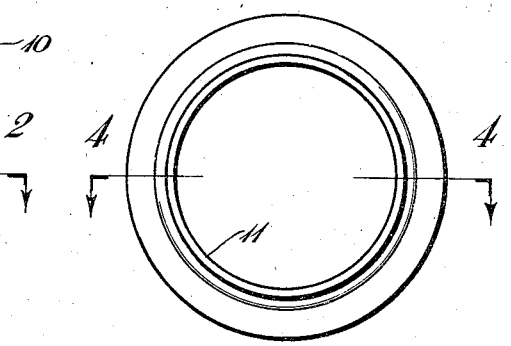
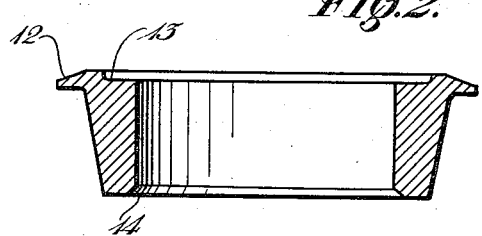
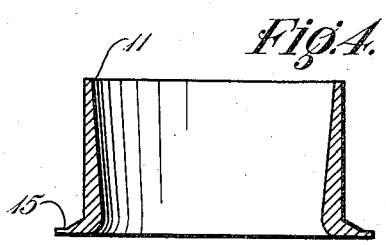
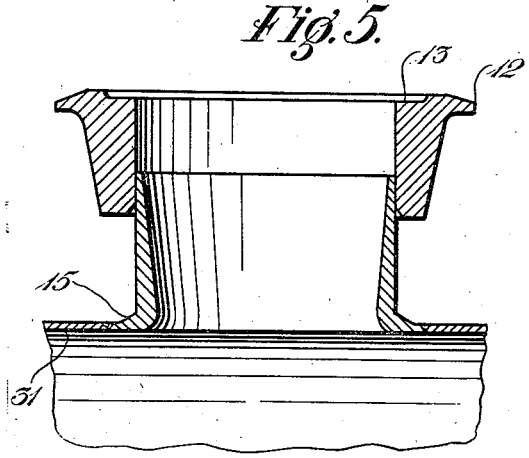
INVENTOR
Claude D. Rieger
BY
Ely & Frye
ATTORNEYS July 21, 1942.    C. D. RIEGER    2,290,619
METHOD OF REINFORCING PROTUBERANCES ON METALLIC MEMBERS
Filed Oct. 17, 1939    6 Sheets-Sheet 2

INVENTOR
Claude D. Rieger
BY
Ely & Frye
ATTORNEYS

July 21, 1942.  C. D. RIEGER  2,290,619
METHOD OF REINFORCING PROTUBERANCES ON METALLIC MEMBERS
Filed Oct. 17, 1939  6 Sheets-Sheet 3

INVENTOR
Claude D. Rieger
BY
ATTORNEYS

July 21, 1942.   C. D. RIEGER   2,290,619
METHOD OF REINFORCING PROTUBERANCES ON METALLIC MEMBERS
Filed Oct. 17, 1939   6 Sheets-Sheet 4

INVENTOR
Claude D. Rieger
BY
ATTORNEYS

July 21, 1942.  C. D. RIEGER  2,290,619
METHOD OF REINFORCING PROTUBERANCES ON METALLIC MEMBERS
Filed Oct. 17, 1939  6 Sheets-Sheet 5

INVENTOR
Claude D. Rieger
BY
ATTORNEYS

July 21, 1942.    C. D. RIEGER    2,290,619
METHOD OF REINFORCING PROTUBERANCES ON METALLIC MEMBERS
Filed Oct. 17, 1939    6 Sheets-Sheet 6

INVENTOR
Claude D. Rieger
BY
Ely & Frye
ATTORNEYS

Patented July 21, 1942

2,290,619

UNITED STATES PATENT OFFICE 2,290,619

METHOD OF REINFORCING PROTUBERANCES ON METALLIC MEMBERS

Claude D. Rieger, Trenton, Mich., assignor to The Firestone Tire & Rubber Company, Akron, Ohio, a corporation of Ohio Application October 17, 1939, Serial No. 299,840

3 Claims. (Cl. 29—148.2)

This invention relates to the production of reinforced protuberances on metallic members, especially to the reinforcement of sleeves extending from beverage containers, although it will be seen that the invention has numerous other applications.

Heretofore reinforcements, or sputs, have been secured around outwardly extending sleeves in stainless steel beverage containers by silver soldering the reinforcement to the edge of the sleeve. This method has proven to be unsatisfactory in that the soldering material is expensive, a relatively long period of time is required in order to produce a good joint, and the joints produced tend to be relatively short-lived. That is, the solder cracks, or is broken away from either the sleeve or the reinforcement due to the rough usage of the beverage container, whereby a leak develops at the tapping orifice. Usually leakage at the tap of a beverage container means that the container must be destroyed, as it is very difficult to repair same. This particularly is true in spaced, double-walled containers, in which the leak at the tapping orifice usually permits fluid to collect between the walls of the container, and this fluid is very difficult to remove.

One main object of the invention is to provide metal beverage containers having improved reinforced tapping orifices therein and to provide an uncomplicated method and apparatus for producing the tapping orifices.

Certain specific objects of the invention are to provide apparatus for crimping the end of a sleeve on a beverage container down around a reenforcement circumscribing the sleeve; to provide an easily practiced, positive method for securing reinforcements to outwardly extending sleeves on beverage containers; to engage a reinforcement permanently with the sleeve with a minimum of apparatus and with low labor expense; and to form a tight, sturdy reinforced tapping orifice in a container.

The above and further objects will be made apparent by the following specification which will be described with particular reference to the accompanying drawings, in which:

Figure 1 is an elevation of a reinforcement used in the practice of the invention;

Figure 2 is a cross section on line 2—2 of Figure 1;

Figure 3 is a plan view of a sleeve to be reinforced by the reinforcement of Figure 1;

Figure 4 is a cross sectional elevation on line 4—4 of Figure 3;

Figure 5 is a cross sectional elevation indicating the initial position of the reinforcement upon the sleeve;

Figure 6:
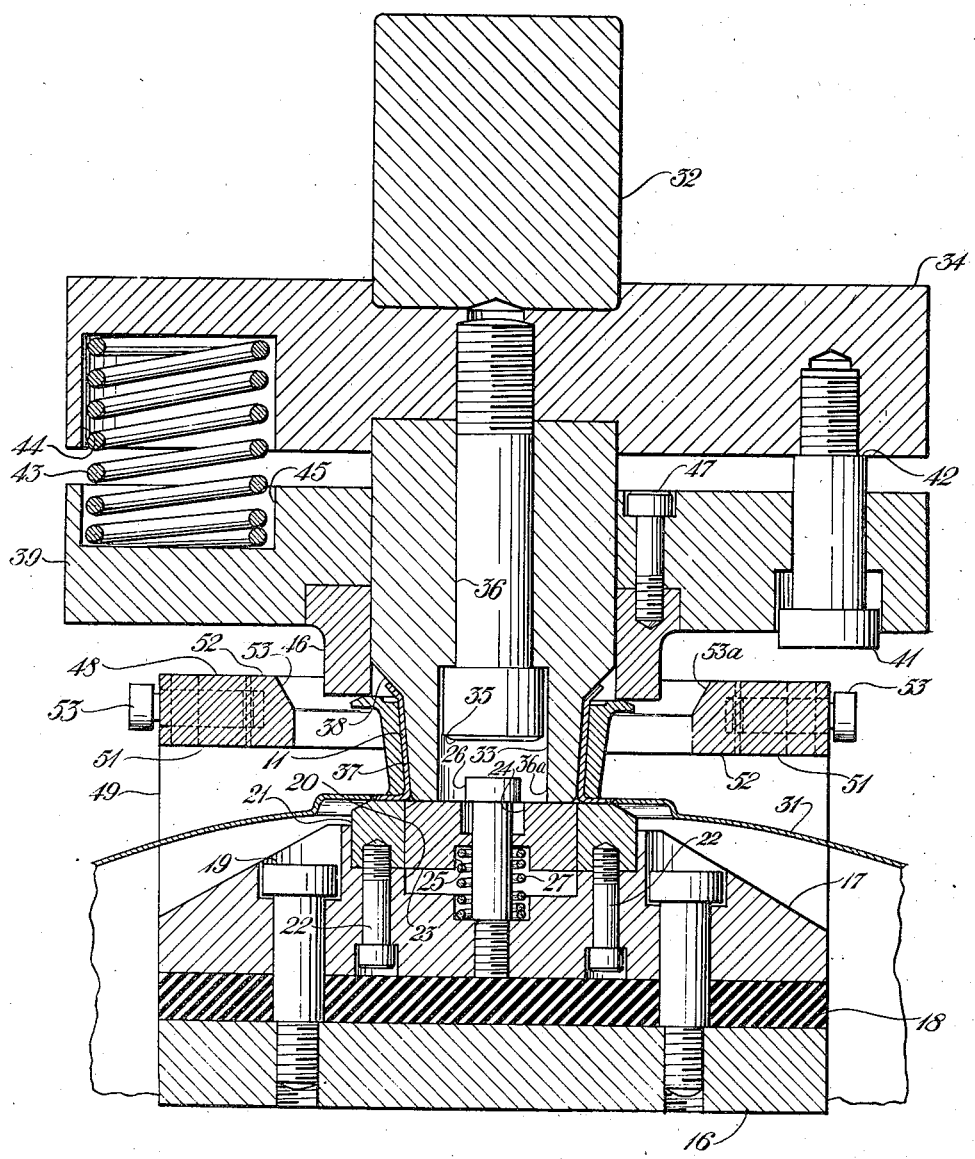
Figure 6 is a vertical sectional elevation of apparatus for practicing the first step of the method of the invention illustrating the apparatus after the step is performed.
Figure 7:
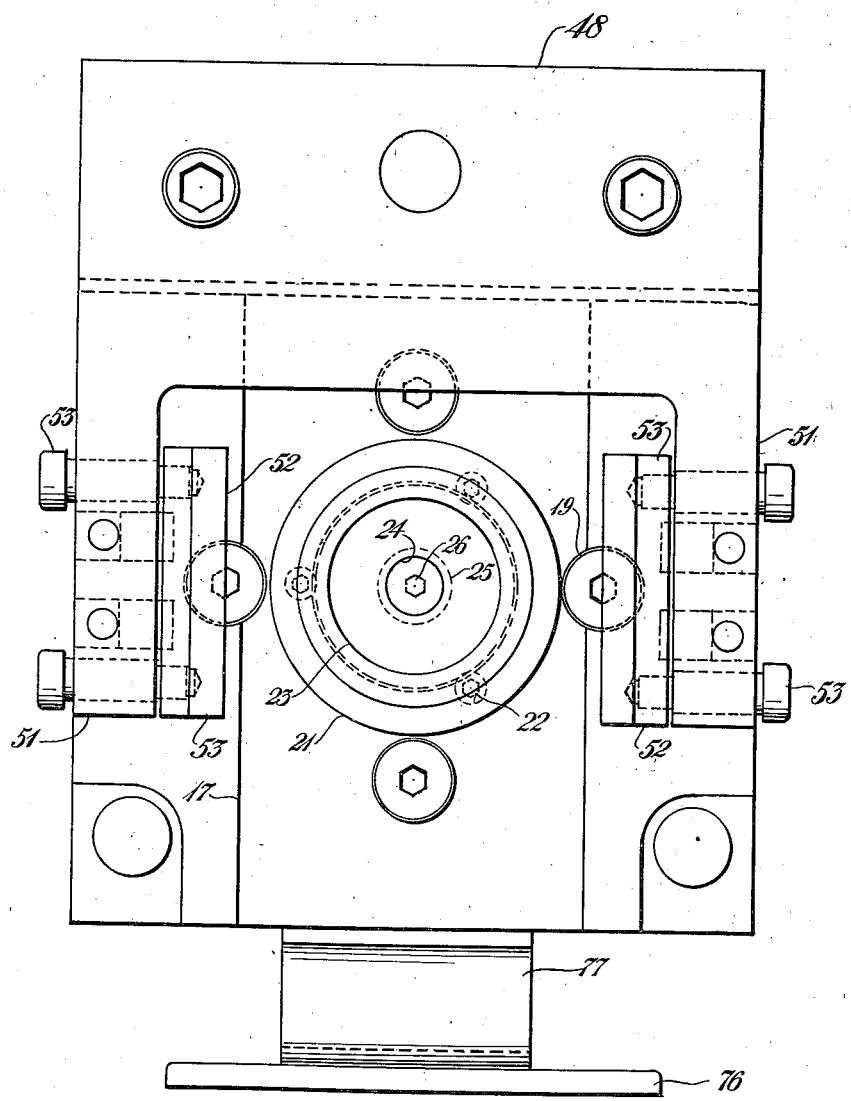
Figure 7 is a plan view of the die-holding apparatus shown in Figure 6.

In general, the present invention resides in securing a reinforcement to a protuberance, such as a sleeve, extending outwardly from a metallic member. The reinforcement is first positioned over the sleeve and then telescoped down over the sleeve until it engages with the metallic member, at which time the end of the sleeve projects from the end of the reinforcement. This projecting end is flared outwardly in the telescoping operation and then pressed down upon the outer edge of the reinforcement to secure same to the metallic member.

The apparatus for practicing the invention includes die-holding means which comprise a suitably mounted die holder which has a resiliently positioned locator extending therefrom, which locator is adapted to engage with a sleeve upon a metal member and center the member upon the die-holding apparatus. A vertically movable punch is provided to engage with the reinforcement positioned upon the sleeve of the metal member and telescope it thereover. Then the punch also functions to press, or flare out the end of the sleeve over the top of the reinforcement. Further punching apparatus is provided to press the flared-out end of the sleeve tightly down upon the reinforcement.

Referring specifically to Figures 1 to 5 of the drawings, a reinforcement, or sput 10 is shown which is adapted to be placed over a sleeve 11 and telescoped into engagement therewith. Figure 2 indicates that the reinforcement 10 has an outwardly extending flange 12 thereon as well as having recessed top and bottom portions 13 and 14 respectively. Figure 5 best shows that the internal diameter of the reinforcement 10 is substantially the same as the outer diameter of the sleeve 11 whereby the reinforcement may be engaged with the sleeve by merely positioning it thereover. However, an external force is required to press the reinforcement down over the sleeve into engagement with a base flange 15 formed on the sleeve. Usually the sleeve 11 is secured to a metallic member which may comprise a section of a beverage container. A section of such a member is shown in Figure 5.

In order to press or telescope the reinforcement 10 into engagement with the sleeve 11, the apparatus shown in Figure 6 is provided. This apparatus comprises a die-holder 16 which resiliently carries a die pad 17 through a rubber block 18, and is secured thereto by means of bolts 19 extending therebetween. The die pad 17 preferably carries a die pad insert 21 in a stepped recess 20 in its center portion, the insert usually being made of harder material than the die pad proper. This insert 21 preferably is secured to the die pad 17 by bolts 22, which are positioned before the die pad is secured to the die holder and whose heads extend into recesses formed in the base of the die pad. A locator 23 is associated with the die pad 17 and normally extends outwardly therefrom in order to provide a centering device for the die holder 16. The locator 23 has upper and lower recesses, 24 and 25 respectively, formed therein. Normally the head of a bolt 26 is received in the upper recess 24, which bolt 26 extends through the locator and engages it with the die pad 17. A spring 27 is received in the bottom of the recess 20 in the die pad 17 and engages with the locator in the lower recess therein in order to urge the locator outwardly relative to the die pad 17. Thus the locator 23 normally projects above the die pad insert 21, but it may be depressed relative thereto (as shown) by a suitable force applied to its upper surface.

Note that a container section 31, having the sleeve 11 secured thereto, is carried by the die-holder and originally centered thereon by means of the locator 23 engaging with the base of the sleeve 11, which is welded or otherwise secured to the container section. The reinforcement 10 is shown in telescoped relation to the sleeve 11 in Figure 6, and punch means 32, which are movable relative to the die holder, are provided to perform the telescoping operation. These means comprise a punch 33 that is mounted in a punch holder 34 by a bolt 35. This bolt extends through a bore 36 provided in the punch 33 with the bolt head being received in an enlarged portion 36a of the bore 36. The punch 33 has a frusto-conical end portion 37, the base of which connects to the punch by an outwardly directed shoulder 38. Upon downward movement of the punch 33, the end portion 37 is constructed and arranged to engage with the sleeve 11 and smoothly and gradually press it outwardly against the reinforcement 10. Continued downward movement of the punch engages the shoulder 38 with the sleeve and flares the end of the sleeve outwardly, as shown in Figure 6.

The punch means 32 carries further means to effect telescoping of the reinforcement 10 over the sleeve 11. These means comprise a stripper plate 39 which is secured in spaced relation to the punch holder 34 by bolts 41, which have shoulders 42 formed thereon at the ends of the threaded portions thereof. These shoulders 42 are brought into engagement with the punch holder 34 and the length of the bolts is adjusted so that the stripper plate is held, by gravity, in spaced relation to the punch holder. Springs 43 are placed between the punch holder and the stripper plate and received in recesses 44 and 45, respectively, formed therein, in order to urge the plate downwardly relative to the punch holder and insure the desired spacing therebetween. An apertured stripper plate insert 46 is secured to, and projects downwardly from, the stripper plate by bolts 47. This insert 46 is adapted to engage with the reinforcement 10 carried by the sleeve 11, and telescope it over the sleeve before the punch 33 engages appreciably with the sleeve 11. Thus the normal position of the stripper plate insert 46 is sufficiently below the punch 33 so that it engages with the reinforcement 10, as desired, before the punch engages with the sleeve 11. Then after the reinforcement is telescoped down around the sleeve 11, the springs 43 are compressed, as shown in Figure 6, and the punch 33 engages with the sleeve 11 and presses or flares out the end thereof, as shown. Note that the tapered end of the punch serves to reinforce the lower part of the sleeve 11 as its upper end is flared or pressed outwardly. Upon upward movement of the punch 33, the springs 43 urge the stripper plate 39 and the insert 46 carried thereby downwardly relative to the punch. This engages the stripper plate insert 46 with the reinforcement 10 and holds it against upward movement whereby the punch 33 can be withdrawn from the sleeve.

Preferably guide means are provided to aid in centering the punch means on the die holder. These means may include a gage plate 48, which is carried by the die holder 16 and spaced therefrom by a spacing block 49. The gage plate 48 has arms 51 extending from the ends thereof, which arms 51 are within the vertical planes of the sides of the die holder and in an elevated horizontal plane relative to the locator 23. Positioning inserts 52 are adjustedly carried by the arms 51 by means of bolts 53. These positioning arms 52 are positioned on the inner sides of the arms 51 and have beveled edges 53ᵃ which slant inwardly towards the locator 23.

Figure 8:
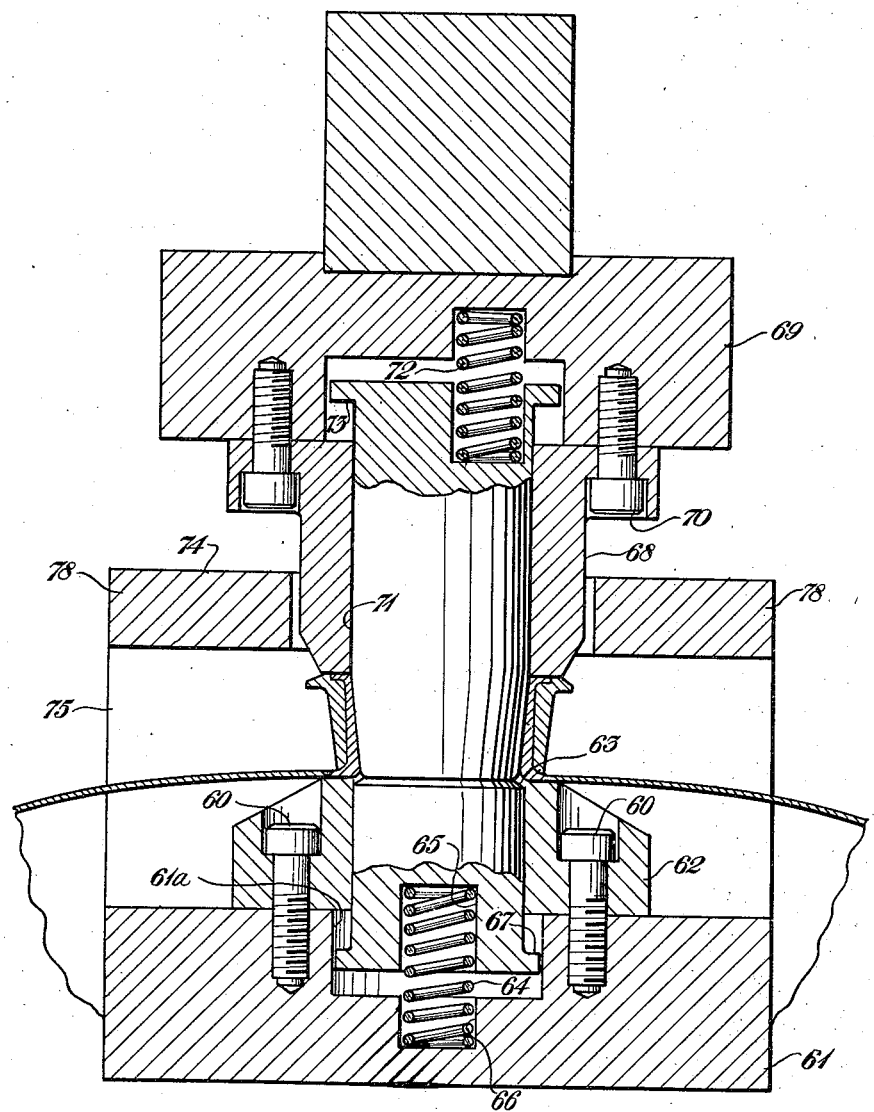
Figure 8 is a vertical cross sectional elevation of apparatus for practicing the last step of the method of the invention, the apparatus being shown at the completion of its movement.
Figure 9:
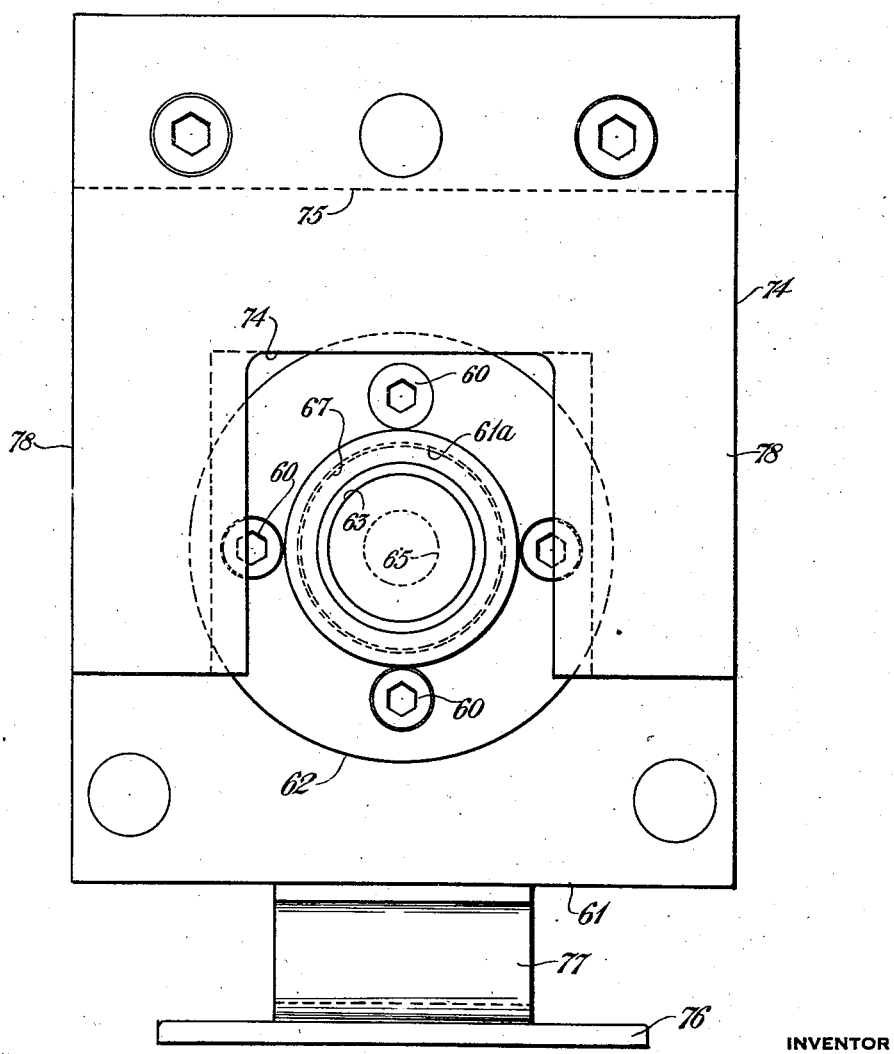
Figure 9 is a plan view of the die-holding means of Figure 8.

After the reinforcement 10 is telescoped upon the sleeve 11 and the end of the sleeve pressed outwardly slightly, the end of the sleeve must be pressed down tightly against the reinforcement. To this end a further punching apparatus, including a die holder 61, is provided; the apparatus being shown in Figures 8 and 9. This die holder mounts an apertured die pad 62, which is secured to the die holder by bolts 60, and which receives a locator 63 therein. This locator is urged upwardly by a spring 64 which engages with recesses 65 and 66 formed in the locator and die holder respectively. The lower end of the locator 63 is received in a relatively large recess 61a formed in the die holder and a base flange 67 is formed on the locator 63 to prevent the locator from being pushed out of the die pad 62 by the spring 64. A punch 68 is provided to press the sleeve 11 against the reinforcement 10. This punch 68 is secured to a punch holder 69 by bolts 70 and it receives a centering member 71 in its bore. This member 71 normally projects an appreciable distance from the punch 68 and it is urged downwardly by a spring 72, which is received between the punch holder and the centering member. A base flange 73 is formed on the member 71 to engage with punch 68 and limit downward movement of the member 71. On downward movement of the punch holder 69 relative to the die holder 61, the centering member 71 first engages with the sleeve 11 and comes into tight engagement therewith. Then the punch 68 presses the outwardly flared position 11a of the sleeve 11 tightly down into the recess 13 formed in the top of the reinforcement. Note that the centering member reinforces the sleeve as the punch presses down its outer edge. Preferably a centering or a guide plate 74 is carried on the die holder 61 and is spaced therefrom by a block 75. The punch moves vertically between arms 78 formed on the guide plate 74.

Figure 10:
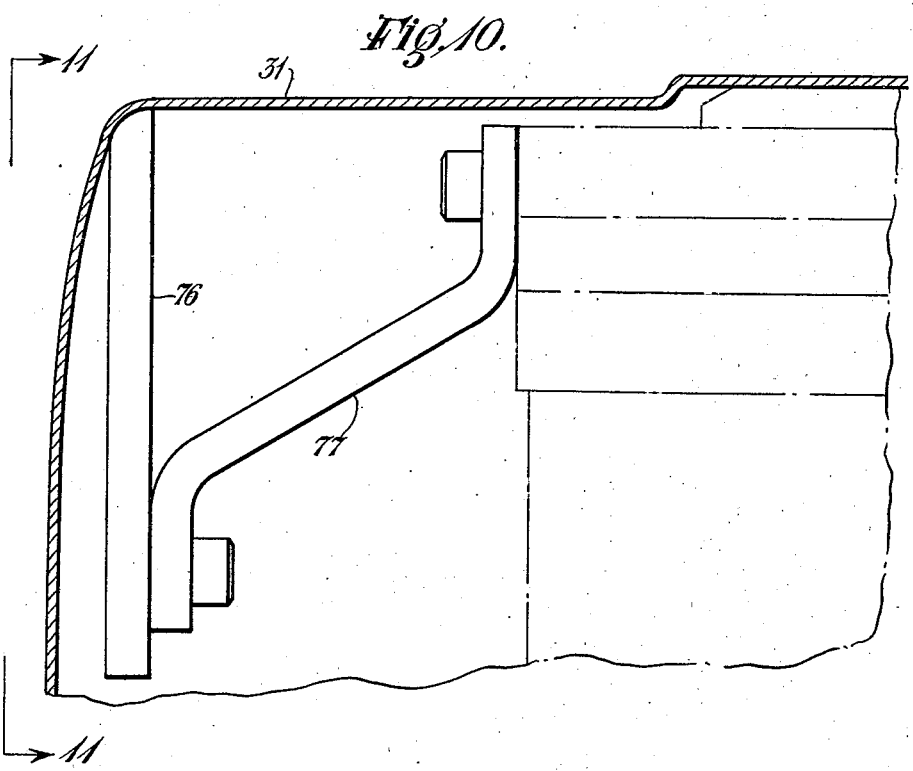
Figure 10 is an elevation of the container positioning apparatus used in conjunction with the apparatus shown in Figures 6 and 8.
Figure 11:
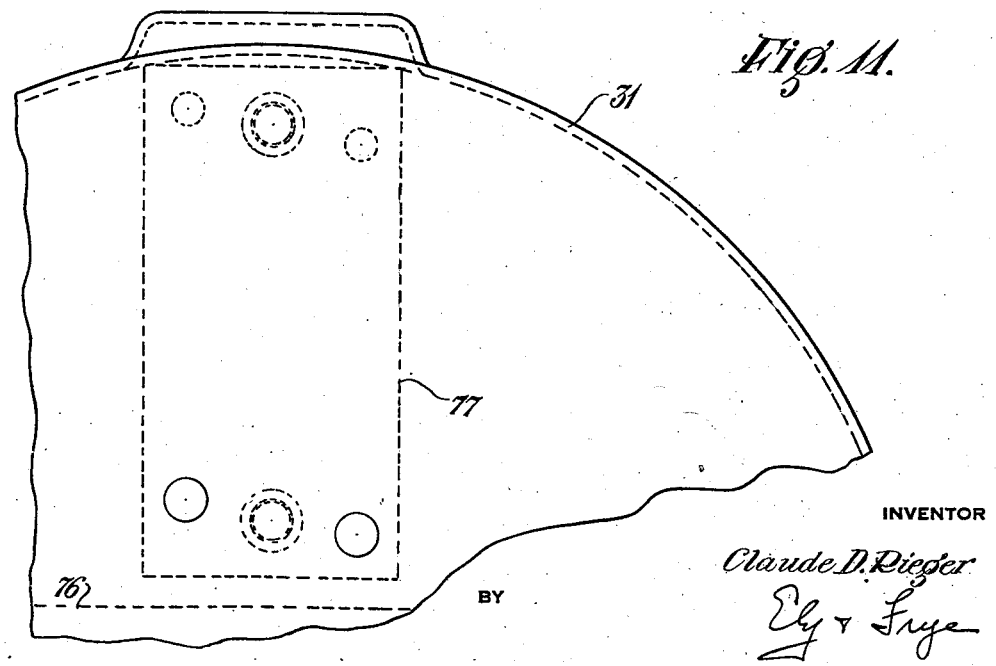
Figure 11 is an elevation of the apparatus shown in Figure 10, taken upon line 11—11.

In order to aid in mounting a container section 31 upon either part of the apparatus of the invention, positioning plates 76 are provided. These plates 76 are of arcuate section and are secured to the associated die holders by substantially Z-shaped brackets 77 which are secured in place in any desired manner. Thus the positioning plates 76 are spaced outwardly from the die holders and can engage with a corner of the container section, as shown in Figure 10, to insure the container section being properly positioned on the die holders when the die holders are received within the open end of the container section. This simplifies the operations of the operator of the machine as the container section will retain a given position upon the die holder.

It will be seen that practice of the invention permits a reinforcement to be positioned around a sleeve formed on a metallic member in two simple operations of relatively uncomplicated apparatus. Thus the invention provides a ready method of forming a reinforced sleeve on a metallic member and the objects of the invention are achieved.

While one embodiment of the invention is completely illustrated and described herein, it will be apparent that the scope of the invention, as defined by the appended claims, covers modifications of the embodiment of the invention disclosed herein.

What is claimed is:

1. That method of reinforcing a hollow projection on a metallic member, which method comprises telescoping a reinforcement over the projection, inserting a punch into the projection to force it outwardly against the reinforcement, the projection extending beyond the reinforcement, and flaring the protruding end of the projection outwardly while the punch forces the projection against the reinforcement, all of said actions occurring in one operative action of the apparatus, withdrawing the punch, and retaining the sleeve in pressure engagement with the reinforcement while riveting the flared end of the projection to the outer wall of the re-inforcement.

2. That method of reinforcing a hollow projection on a metallic member, which method comprises telescoping a reinforcement over the projection until the reinforcement abuts the member, the projection extending beyond the reinforcement, forcing a punch into the projection to press it outwardly against the reinforcement, flaring the protruding end of the projection outwardly while the punch presses the projection out against the reinforcement, withdrawing the punch, inserting a second punch into the flared projection to retain it out against the reinforcement, and pressing the flared end of the projection tightly down upon the reinforcement.

3. A method of reinforcing a throat-like portion of a walled container, said method comprising supporting the container wall portion adjacent the sleeve and forcing a reinforcing ring, narrower than the sleeve, over the sleeve to abut the supported portion with the sleeve end extending outwardly beyond the ring, outwardly flanging the sleeve as the ring approaches abutment with the container, and applying clamping pressure between the sleeve flange and the wall support to rivet the flange to the ring.

CLAUDE D. RIEGER.